United States Patent [19]

Wu

[11] Patent Number: 5,654,260

[45] Date of Patent: Aug. 5, 1997

[54] CORROSION INHIBITOR FOR WELLBORE APPLICATIONS

[75] Inventor: Yulin Wu, Bartlesville, Okla.

[73] Assignee: Phillips Petroleum Company, Bartlesville, Okla.

[21] Appl. No.: 458,625

[22] Filed: Jun. 2, 1995

Related U.S. Application Data

[62] Division of Ser. No. 179,414, Jan. 10, 1994, Pat. No. 5,565,416.

[51] Int. Cl.$^6$ ..................................... C09K 7/02
[52] U.S. Cl. .................. 507/264; 507/939; 507/103
[58] Field of Search ..................... 507/264, 939

[56] References Cited

U.S. PATENT DOCUMENTS 5,565,416 10/1996 Wu .............................. 507/939

*Primary Examiner*—David B. Springer
*Attorney, Agent, or Firm*—Gary L. Haag

[57] ABSTRACT

This invention concerns a corrosion-inhibitor nominally comprised of a phenolic compound and a hydroxide-bearing compound capable of imparting a pH of 9 to water, the inclusion thereof in aerated water-based fluids and foams, and the use of these fluids in wellbore applications; particularly applications conducted at elevated temperatures.

22 Claims, No Drawings

CORROSION INHIBITOR FOR WELLBORE APPLICATIONS

This application is a divisional of application Ser. No. 08/179,414 filed Jan. 10, 1994, now U.S. Pat. No. 5,565,416.

BACKGROUND OF THE INVENTION

This invention relates to a corrosion inhibitor and the use thereof in wellbore applications.

Aerated liquids and foams are frequently employed as wellbore fluids during drilling, completion, workover and production operations. Aerated as used herein refers to the existence of distinct gas and liquid phases. Aerated liquids are distinguishable from foams by the absence or the presence in de minimis amounts of surface active agents which promote gas-liquid interphase dispersibility.

Aerated liquids and foams are particularly useful when reduced hydrostatic pressures in wellbores are desired. The reduced hydrostatic pressure or head is made possible by the lower bulk densities of aerated liquids and foams when compared to their liquid counterparts. Examples wherein reduced hydrostatic heads are favored include (1) situations where the wellbore fluids are exposed to under-pressured geological strata and minimum invasion of the strata by the wellbore fluid is desired and (2) during the perforation of a geological strata at underbalanced conditions (i.e., wellbore pressure less than fluid pressure in exposed strata) wherein the reduced head helps to minimize plugging of the perforation caused by movement of fines into the perforation from the wellbore.

Aerated liquids are nominally comprised of a gas and a liquid and may additionally contain additives such as corrosion inhibitors and suspended solids such as mud and sand. Aerated fluids useful in drilling, completion, workover and production operations are typically prepared by the downhole combination of a gas and a liquid. In drilling, one means of combining these components downhole is by the use of dual drill strings and dual swivels. Another means frequently used in downhole applications is to employ parasitic tubing for transporting the gas downhole to an injection point where it is combined with liquid and returned to the surface. Injection of gas at any downhole location serves to reduce the bottomhole hydrostatic head from that of a 100% liquid head. Downhole gas injection is also practiced when gas lift is used to facilitate fluids production in a well.

Foams are highly dispersed gas in liquid two-phase systems. A foam is physically composed of gas bubbles surrounded by a surfactant-bearing aqueous film and is nominally comprised of a gas, at least one surfactant which functions as a foaming agent, and water. The quality of the foam or foam quality is defined to be the volume percent of gas in the two-phase mixture. The water used in foams may be chemically pure, fresh, or contain varying degrees of salinity and/or hardness. The foam may additionally be comprised of other additives which alter the properties of the foam. Such additives include selected polymers and/or bentonite which increase film strength thereby forming stiff or gel foams and corrosion inhibitors which function to decrease foam corrosivity in metal-bearing systems.

The rheological properties of foam are complex and provide a separate and distinct basis for distinguishing foam from aerated and non-aerated liquids. The theological properties are dependent upon many parameters such as bubble size and distribution, fluid viscosity, foam quality, end the concentration and type of foaming agent used. The use of foam in place of conventional fluids generally reduces the degree of fluid invasion from the wellbore into the surrounding strata. Furthermore, the foam which does invade the strata generally contains a high volume percentage of gas which upon pressurization possesses significant energy. Upon depressurization, the stored energy which is released causes a significant portion of this fluid to be returned to the wellbore. Compared to conventional fluids, foam also possesses at low linear flow velocities excellent carrying capacities, particularly for water and solids. These properties are particularly useful when conducting drilling, completion and workover operations on vertical and horizontal wells and even more so when low pressure, semi-depleted or water sensitive formations are encountered. The unique properties of foam also enable the use of coiled tubing units during workover operations. The use of such units results in significant savings of time and money because downhole operations can be performed without removal of the wellbore tubing.

Historically, a major problem associated with the use of aerated liquids and foams has been metal corrosion attributed to the presence of oxidizing agents such as oxygen, hydrogen sulfide and carbon dioxide in the gas phase. Oxygen generally originates from air. Carbon dioxide and hydrogen sulfide are generally produced from the geological strata of interest. Corrosion problems generally become more severe as wellbore temperatures increase. Because of cost and availability, air is the preferred gaseous species when downhole corrosion is not a problem. However, because of the lack of suitable corrosion inhibitors when downhole conditions become severe ((i.e., high temperatures and the presence of significant quantities of oxidizing agents), inert gases which are expensive, most notably nitrogen, are frequently used.

SUMMARY OF THE INVENTION

It is an object of this invention to develop a corrosion inhibitor suitable for use in gas-liquid systems at oxidative conditions.

It is a further object of this invention to develop a corrosion-inhibited gas-liquid mixture suitable for use under oxidative conditions.

It is a still further object of this invention to develop a corrosion-inhibited foam suitable for use under oxidative conditions.

It is yet a still further object of this invention to develop a corrosion-inhibited oxygen-bearing gas/liquid mixture suitable for use in wellbore applications including drilling, workover, completion and production.

It is still yet a further object of this invention to develop a corrosion-inhibited air/liquid mixture suitable for use at temperatures of at least about 200° F.

Still a further object of this invention to develop a corrosion inhibited oxygen-bearing gas/liquid mixture wherein the chemicals imparting the corrosion-inhibition properties are relatively inexpensive commodity chemicals.

A yet still further object is to develop a process employing foam suitable for use under highly oxidative conditions in the drilling, completion, workover and production of wells.

In accordance with this invention, a formulation for a corrosion inhibitor comprised of a phenolic compound and a hydroxide-bearing compound capable of imparting basicity to water has been discovered.

In a second embodiment, a corrosion-inhibited gas-liquid mixture nominally comprised of a gas, water, a phenolic compound and a hydroxide-bearing compound capable of imparting basicity to water has been discovered.

In a third embodiment, a novel corrosion-inhibited gas foam nominally comprised of gas, water, foaming agent, and a corrosion inhibitor comprised of a phenolic compound and a hydroxide-bearing compound capable of imparting basicity to water has been discovered.

In a fourth embodiment, a process utilizing the inventive gas-liquid mixture under oxidative conditions such as those existing in wellbore applications has been discovered.

And in a fifth embodiment, a process utilizing the inventive foam under oxidative conditions such as those existing in wellbore applications has been discovered.

DESCRIPTION OF THE INVENTION

In its multiple embodiments, this invention concerns a unique formulation for a corrosion inhibitor, a formulation for corrosion-inhibited aerated liquids, a formulation for corrosion-inhibited foams, and the use thereof of the aerated liquids or foams in wellbore applications which include drilling, workover, completion and production operations.

Corrosion Inhibitor

The inventive corrosion inhibitor is nominally comprised of at least one phenolic compound including the salts thereof and at least one hydroxide-bearing compound capable of imparting a pH of at least 9 to an aqueous phase. The hydroxy-bearing hydrocarbon compound is preferably a phenolic compound of the formula

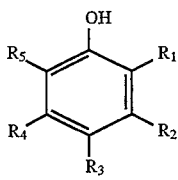

wherein $R_1$, $R_2$, $R_3$, $R_4$ and $R_5$ are independently selected from the group consisting of hydroxyl groups, alkoxy groups containing from 1 to 6 carbon atoms; alkyl groups containing from 1 to 6 carbon atoms, a phenyl group, $NO_2$, COOH, COH, sulfonic acids, ketones containing from 1 to 6 carbon atoms, F, Cl, Br, I, hydrogen, or the salts of any of the preceding acids or alcohols, wherein at least two of the above R groups are hydrogen; or phenolic mixtures thereof, and the resulting compound is water dispersible or soluable.

Another group of compounds included within the term phenolic compound are the flavotannins. Flavotannins are polyphenolic materials which are extracted from the bark and wood of trees. Quebracho is an example of a suitable flavotannin.

Representative examples of suitable phenolic compounds are those selected from the group consisting of monohydroxy phenols, polyhydroxy phenols, monohydroxy naphthols, polyhydroxy naphthols, o-cresol, m-cresol, p-cresol, o-fluorophenol, m-fluorophenol, p-fluorophenol, o-chlorophenol, m-chlorophenol, p-chlorophenol, o-bromophenol, m-bromophenol, p-bromophenol, o-iodophenol, m-iodophenol, p-iodophenol, o-nitrophenol, m-nitrophenol, p-nitrophenol, flavotannins, phenol, resorcinol, catechol, hydroquinone, phloroglucinol, pyrogallol, 1,3-dihydroxynaphthalene, o-methoxyphenol, p-methoxyphenol, m-methyoxyphenol, o-hydroxybenzoic acid, p-hydroxybenzoic acid, m-hydroxybenzoic acid, o-phenolsulfonic acid, p-phenolsulfonic acid, m-phenolsulfonic acid, dichlorophenols, 4,4-biphenol, salicylaldehyde, guaiacol and the salts of the preceding acids and alcohols or mixtures thereof selected from the preceding group.

The phenolic compound is more preferably phenol, o-cresol, o-fluorophenol, o-chlorophenol, o-bromophenol, o-iodophenol, o-nitrophenol, catechol, resorcinol, guaiacol, hydroquinone, salicylaldehyde, phloroglucinol, pyrogallol, 4,4-biphenol, 1,3-dihydroxy naphthalene or o-allylphenol or any of the salts of the preceding or mixtures thereof of the preceding. Still more preferred are those selected from the group consisting of phenol, o-cresol, salicylaldehyde, o-nitrophenol and the ammonium, sodium and potassium salts thereof or mixtures of the preceding. The most preferred phenolate salts are those of sodium and potassium. Based on performance, cost, and commercial availability, the most preferred phenolic compounds are phenol and the sodium and potassium salts thereof which are sodium phenolate and potassium phenolate.

The hydroxide-bearing compound must be a compound capable of imparting a pH of 9 to an aqueous phase. Preferred hydroxide-bearing compounds are the alkali metal hydroxides, ammonium hydroxide or mixtures thereof. More preferred are those selected from the group consisting of ammonium hydroxide, sodium hydroxide and potassium hydroxide. Of these, sodium hydroxide and potassium hydroxide are still more preferred. Most preferred is potassium hydroxide.

The hydroxide-bearing compound must be present in an amount effective to insure appreciable dissociation of the hydrogen atoms associated with the hydroxyl group or groups on the phenolic compound. On a molar basis, a mole ratio of hydroxide-bearing compound to phenolic compound of 5 to 1000 is preferred. A mole ratio of about 10 to about 500 more preferred. A ratio of about 20 to about 350 is most preferred. When using the preferred hydroxide-bearing compounds consisting of ammonium hydroxide, potassium hydroxide or sodium hydroxide or mixtures thereof and the most preferred phenolic compound, phenol, a hydroxide compound to phenol weight ratio of about 10 to about 70 is preferred. When using the more preferred sodium hydroxide and potassium hydroxide species, a weight ratio of about 10 to about 40 is preferred.

The corrosion inhibitor may additionally be comprised of water in an amount effective to function as a dispersing or carrying agent for the phenolic compound and the hydroxide-bearing compound thereby simplifying the mixing of these components with other components when preparing aerated liquids or foams. The water may be chemically pure, fresh or contain appreciable salinity and/or hardness and may contain dissolved gases which favor oxidation.

The inventive corrosion inhibitor is distinguished from many other inhibitors, particularly scavengers, by its ability to effectively function when the molar ratio of a key active component, the phenolic compound, to the oxidizing agent or agents in the system is significantly less than 1. The corrosion inhibitor is effective at both ambient and elevated temperatures. The inventive inhibitor is also distinguishable from many commercially available inhibitors by its effectiveness at temperatures of at least about 200° F. and is further distinguished by its superior corrosion inhibition properties at temperatures of at least about 350° F. The corrosion inhibitor is particularly effective when the oxidizing agent is oxygen or the oxidation-related compounds thereof.

Corrosion-Inhibited Aerated Liquid

A corrosion-inhibited aerated liquid possessing various utilities as a wellbore fluid has been discovered. The aerated liquid is nominally comprised of a gas which contains an oxidizing agent, water, and the inventive corrosion inhibitor described in the previous section. As previously noted, the corrosion inhibitor is particularly effective when the oxidizing agents are hydrogen sulfide, carbon dioxide, and oxygen or oxidation-related compounds to these agents. Treatment of aerated liquids containing oxygen as the oxidizing agent is preferred. The water may be chemically pure, fresh, or contain appreciable salinity and/or hardness and may contain dissolved gases, some of which may favor oxidation. The aerated liquid may additionally be comprised of solids such as sand and dirt or a separate organic phase.

Aerated liquids are particularly useful when a reduction in the bulk density of the base liquid is desired. Such a need frequently occurs in wellbore applications when a reduction in hydrostatic head is desired.

An aerated liquid is prepared by combining a gas containing at least one oxidizing agent, a water-based liquid, and the corrosion inhibitor using ordinary skill in the art. Preferably, the water-based liquid and corrosion inhibitor are first combined to form a corrosion inhibited liquid. The gas is then added via contacting the liquid and gas phases. In the drilling, completion, workover, or production of a well, the latter contacting step is usually conducted downhole in a borehole using ordinary skill in the art.

The corrosion inhibitor may also be used in well production wherein gas lift technology is used. In such an application, the corrosion inhibitor may be combined downhole with the gas used for gas lift and the produced fluids which contain water. In such an application, the reduced hydrostatic head allows the reservoir fluids, which may also include a separate gas phase, to flow to the surface using the existing reservoir pressure as the driving force thereby avoiding the use of more complicated and expensive means of production such as pumpjacks, submersible pumps, etc. In such an operation, gaseous oxidizing agents such as hydrogen sulfide, carbon dioxide, or oxygen and oxidation-related compounds of these agents may be present in either the gas used for the gas lift or in the fluids produced from the reservoir.

The required concentration of corrosion inhibitor in the aerated fluid is that amount effective to insure corrosion inhibition over the time frame of interest at the conditions of interest. These concentrations may be readily ascertained by one skilled in the art via routine test procedures. Generally, the preferred weight percent of hydroxide-bearing compound and phenolic compound based on the combined weight of water and corrosion inhibitor are about 0.1 to about 40 wt % and about 0.005 to about 4.0 wt %, respectively. More preferred are respective weight percent ranges of about 1 to about 20 wt % and about 0.01 to about 0.50 wt %, respectively. Still more preferred are respective weight percent ranges of about 1 to about 10 and about 0.05 to about 0.30. The most preferred weight percent ranges are about 5 to about 10 and about 0.10 to about 0.30, respectively.

One factor distinguishing the inventive corrosion inhibitor from other inhibitors, particularly scavengers, when incorporated into aerated liquid, is the ability of the inhibitor to effectively function when the molar ratio of a key active component, the phenolic compound, to the oxidizing agent or agents in the system is significantly less that 1. The corrosion-inhibited aerated liquid may be used in metal-bearing systems at both ambient and elevated temperatures. An additional factor distinguishing the inventive inhibitor from the many commercially available inhibitors is its effectiveness at temperatures of about or greater than 200° F. and even more so, its effectiveness at temperatures of about or greater than 350° F. The corrosion inhibitor when incorporated into an aerated liquid is particularly effective when the oxidizing agent is oxygen or the oxidation-related compounds thereof.

Corrosion-Inhibited Foam

The inventive corrosion-inhibited foam is nominally comprised of a dispersed gas phase wherein the gas contains an oxidizing agent and a continuous liquid phase nominally comprised of a foaming agent, water in a major portion, and the inventive corrosion inhibitor. The water may be chemically pure, fresh, or contain appreciable salinity and/or hardness, and may contain dissolved gases, some of which may favor oxidation. At the discretion of one skilled in the art, the liquid phase may contain other additives which function to produce a better performing foam at the conditions of use. Foam stabilizers are one such example. The foam may additionally contain solids such as sand and dirt and/or a separate organic phase.

The volume percentage of the combined gaseous and liquid phase which is gas is defined to be the foam quality. The quality of the foam is preferably about 60 to about 99.75% and more preferably about 75 to about 99.5 volume percent at wellbore conditions. The properties of the foam may be altered by the use of various additives known to those skilled in the art. As an example, a stiffer foam may be prepared by adding guar gum or other organic polymers and solids such as bentonite to the base components.

The gaseous phase may initially contain an oxidizing agent or the phase may be inert and absorb oxidizing agents such as oxygen, hydrogen sulfide or carbon dioxide or oxidation-related compounds during the course of process operation. Because of the effectiveness of the inventive corrosion inhibitor, when oxygen is the oxidizing species, inhibited foams containing oxygen are particularly favored. Because of cost and availability, a gaseous phase comprised in major portion of air is preferred.

As previously discussed for the aerated liquid, corrosion inhibitor in an amount effective to insure corrosion inhibition over the time frame of interest at the conditions of interest is required. These concentrations may be readily ascertained by one skilled in the art via routine test procedures. Specific ranges of preference based on the combined weight percentage of water, corrosion inhibitor and foaming agent are identical to those reported for the aerated liquid wherein said weight percentage was based on water and corrosion inhibitor.

One factor distinguishing the inventive corrosion inhibitor from other inhibitors, particularly scavengers, when incorporated into foam is the ability of the inhibitor to effectively function when the molar ratio of a key active component, the phenolic compound, to the oxidizing agent or agents in the system is significantly less than 1. The corrosion-inhibited foam may be used in metal-bearing systems at both ambient and elevated temperatures. An additional factor distinguishing the inventive corrosion-inhibited foam from many foams using commercially available inhibitors are the corrosion inhibition properties exhibited at temperatures of about and greater than 200° F. and more so, the superior corrosion inhibition properties exhibited at temperatures of about and greater than 350° F. The corrosion inhibitor is particularly effective when the oxidizing agent is oxygen or oxidation-related compounds thereof.

Foaming agent in an amount effective to obtain the desired foam quality is required. The concentration will be

active ingredients in Homco SF-1009. The preferred concentrations for the preceeding two component foaming agent systems are about 0.0025 to about 2.0 wt % for each component based upon the weight of water, corrosion inhibitor and foaming agent in the liquid phase. More preferred are concentrations for each component of about 0.01 to about 2.0 wt %. Still more preferred are concentrations for each component of about 0.05 to about 0.15 wt %. Most preferred are concentrations for each component of about 0.08 wt %.

Foam is generally prepared using surface facilities wherein the gas which will become the dispersed phase and the liquid which will become the continuous phase are combined in a turbulent manner. Generally, this step is conducted by combining the gas and liquid components under turbulent conditions at a "mixing T". A second method of foam generation is to separately flow the liquid and gas down the wellbore using separate confining means and to then combine the gas and liquid downhole thereby creating foam in the wellbore. The confining means are those readily available to one skilled in the art and include wellbore tubing, drillsteam, the annular space between the tubing or drillstream and the wall or well casing, and parasitic tubing. In a third method, the foam is generated in the wellbore by the cocurrent flow of gas and liquid down and back up the wellbore. A good foam will generally have the consistency of shaving cream.

In the preferred method, the foam is generated at the surface by intimately mixing the gas and liquid thereby forming foam and injecting the foam into either the tubular or annular space in the wellbore. The wellbore fluid is produced via the non-injected tubular or annular space. Foam velocity is dependent upon the type of wellbore operation being performed and the designation of said operating conditions is readily within the capabilities of one possessing ordinary skill in the art.

EXAMPLES

Control Test Series #1

These laboratory screening tests indicated that two commercially available corrosion inhibitors identified for possible use in air/foam wellbore operations are ineffective at the conditions herein studied. These tests employed air as the gas phase and a process temperature of 120° F. Corrosivity was observed to increase as the concentration of inhibitor or foamer (i.e., foaming agent) increased.

Unless otherwise noted, the tests were conducted using the Wheel Test Method as detailed in NACE Publication 1D182. The test solutions were prepared from 2% potassium chloride field brine, a designated foaming agent, air, and one of two designated and commercially available corrosion inhibitors. The test vessels were constructed of Hastalloy C Steel and each vessel contained two 2½ inch × ½ inch carbon steel coupons. The coupons were accurately weighed prior to the test. Each vessel possessing a volume of approximately 45 ml was charged with 30 ml of total fluid consisting of 2% KCl brine and a designated amount of chemical. The vapor space above the liquid in each vessel was purged with air and the vessel subsequently pressurized with air to a pressure of 3 psig. The test vessels were then attached to the wheel and rotated for a period of one day at a test temperature of 120° F.

Each test vessel was then cooled to ambient temperature, the pressure released, and the vessel opened. The test coupons were retrieved and first cleaned using a corrosion-inhibited acid wash. The coupons were further cleaned by contacting with a steel wool pad to remove residual corrosion by-products. The coupons were then weighed and based on the difference between initial and final coupon weights, the corrosion rate was calculated. The reported corrosion rate in mils per year is an averaged rate based on the two test coupons used in each test.

As shown in Table I, Inhibitors A and B and the Foamer which are marketed commercially as Homco MC-21, Homco MC-117 and Homco SF-1009 respectively, failed to inhibit oxygen corrosion at the test conditions. The active components for some of these inhibitors and their respective sources are identified in Table X. The former two chemicals are routinely used in the field as corrosion inhibitors and the latter chemical is used in the field as a foaming agent. For each of these chemicals, the corrosion rate was observed to increase with increasing chemical composition and the corrosion rates were greater than the observed rate without chemical. All test coupons showed some pitting.

TABLE I

Wheel Test Results at 120° F. for Two Commercial Inhibitors[a]

| Run No. | Inhibitor[1] A (wt %) | Inhibitor[2] B (wt %) | Foamer[3] (wt %) | Air (psig) | Temperature (°F.) | Time (hrs.) | Corrosion Rate (mph) |
|---|---|---|---|---|---|---|---|
| 1 | 0 | 0 | 0 | 0 | 68 | 24 | 17.4 |
| 2 | 0 | 0 | 0 | 3 | 120 | 24 | 51.2 |
| 3 | 0.01 | 0 | 0 | 3 | 120 | 24 | 53.2 |
| 4 | 0.03 | 0 | 0 | 3 | 120 | 24 | 54.6 |
| 5 | 0.05 | 0 | 0 | 3 | 120 | 24 | 56.4 |
| 6 | 0 | 0.01 | 0 | 3 | 120 | 24 | 53.3 |
| 7 | 0 | 0.03 | 0 | 3 | 120 | 24 | 55.7[b] |
| 8 | 0 | 0.05 | 0 | 3 | 120 | 24 | 58.6[b] |
| 9 | 0 | 0 | 0.01 | 3 | 120 | 24 | 55.2 |
| 10 | 0 | 0 | 0.03 | 3 | 120 | 24 | 53.0 |
| 11 | 0 | 0 | 0.05 | 3 | 120 | 24 | 70.7 |

[a]30 ml of total fluid used in each test. System volume of approximately 45 ml. Fluid consisted of 2% KCl brine plus additives. Vapor spaces purged with air and then pressurized to 3 psig, except for Test No. 1.
[b]All coupons showed some pitting but pitting for these was quite severe.
[1]Homco MC-21
[2]Homco MC-117
[3]Homco SF-1009

Control Test Series #2

These control tests demonstrate the complexity of formulating a foam which possesses corrosion inhibition properties. These control tests specifically examine the unique interactions between Inhibitor A (Homco MC-21), Inhibitor C (Homco AC-105-C) and Foamer (Homco SF-1009). The active components for some of these inhibitors and their respective sources are identified in Table X.

The tests were conducted using the general procedure described for Control Test Series 190 1. The observed corrosion rate for Run #4 which contained the two corrosion inhibitors and the foamer at designated concentrations was 4.77 mpy. However, when the concentrations of Inhibitors A and C and the foamer were increased 2½-fold and 5-fold as in Runs #5 and #6, the corrosion rates were respectively increased by at least 3-fold and 7-fold. When the respective chemical compositions were reduced by 50% from that of Run #4, the corrosion rates increased by nearly 15-fold. This latter corrosion rate was similar to that obtained during Runs #1 and #2 wherein the samples did not contain Inhibitor C but did contain the other two chemicals. These results are presented in Table II.

observed corrosion rate. Test results for Runs #1 presented in Table III for Control Test Series #3 are similar to the results for Runs #1 and #2 and for Run #6 presented in Table II for Control Test Series #2. The active components for some of the identified inhibitors and their respective sources are provided in Table X.

TABLE III

Results for Corrosion Test Series #3 Conducted at 120° F. Using Corrator Test Method[a]

| Run No. | Inhibitor[1] A (wt %) | Inhibitor[2] C (wt %) | Foamer[3] (wt %) | Temperature (°F.) | Corrosion Rate (mpy) Average | Final |
|---|---|---|---|---|---|---|
| 1 | 0.10 | 0 | 0.25 | 120 | 47.3 | 51.1 |
| 2 | 0.02 | 0.02 | 0.05 | 120 | 6.9 | 1.7 |
| 3 | 0.10 | 0.10 | 0.25 | 120 | 23.9 | 20.0 |

[a]Test fluids were 900 ml 2% KCl field brine, 100 ml Kerosene and the designated weight percentage of additives. Fluids were air saturated at ambient pressure. Tests lasted 24 hours.
[1]Homco MC-21
[2]Homco AC-105-C
[3]Homco SF-1009

TABLE II

Wheel Test Results at 120° F. for Identified Commercial Inhibitors[a]

| Control Test No. | Inhibitor[1] A (wt %) | Inhibitor[2] C (wt %) | Foamer[3] (wt %) | Air (psig) | Temperature (°F.) | Time (hrs.) | Corrosion Rate (mph) |
|---|---|---|---|---|---|---|---|
| 1 | 0.10 | 0 | 0.25 | 2.5 | 120 | 24 | 65.7[b] |
| 2 | 0.10 | 0 | 0.25 | 2.5 | 120 | 24 | 67.9[b] |
| 3 | 0.01 | 0.01 | 0.025 | 2.5 | 120 | 24 | 67.0[b] |
| 4 | 0.02 | 0.02 | 0.050 | 2.5 | 120 | 24 | 4.77 |
| 5 | 0.05 | 0.05 | 0.125 | 2.5 | 120 | 24 | 15.68[c] |
| 6 | 0.10 | 0.10 | 0.250 | 2.5 | 120 | 24 | 36.1[c] |

[a]180 ml of total fluid used in each test consisting of 10 vol % kerosene and 90 vol % of 2% KCl solution to which was added the identified concentrations of chemicals. Total system volume was approximately 215 ml.
[b]Pitting
[c]Slight pitting
[1]Homco MC-21
[2]Homco AC-105-C
[3]Homco SF-1009

Control Test Series #3

The test results for Control Test Series #3 were obtained using the Corrator® test method. The results are consistent with the observations reported for Control Test #2. Below and above an apparently narrow concentration range, the inhibitors at 120° F. were found to be ineffective.

The tests were carried out in a 1-liter Erlenmeyer flasks equipped with magnetic stirring bars under laboratory conditions designed to simulate the corrosive oil-water environment frequently encountered in field operation. The rate of corrosion and the relative effectiveness of the treatment process was determined using a Corrator® monitoring system (Rohrback Instruments). Each test consisted of fastening two one-inch long carbon-steel electrodes to a probe and suspending the probe in a stirred inhibitor/foamer bearing solutions of the composition provided in Table III. The process temperature was 120° F.

Consistent with the observations for Control Test Series #2, Run #2 containing 0.02 wt % Inhibitor A (Homco MC-21), 0.02 wt % Inhibitor C (Homco AC-105-C) and 0.05 wt % Foamer (Homco SF-1009) produced the lowest

Control Test Series #4

Run Numbers 1–24 in Control Test Series #4 established Inhibitor D (Amtech MC-1) to be ineffective as a corrosion inhibitor at the conditions studied. Runs 25–42 wherein Inhibitor E (Amtech B-1) was used demonstrated relatively low corrosion rates at the test conditions. The inhibitors may be obtained from the source identified in Table X.

All tests were conducted at 120° F. using the procedures previously presented in Control Test Series #1. Test results for this test series are presented in Table IV.

TABLE IV

Wheel Test Results at 120° F. for identified Commercial Inhibitors[a]

| Run No. | Inhibitor[1] A (wt %) | Inhibitor[2] D (wt %) | Foamer[3] (wt %) | Air (psig) | Temperature (°F.) | Time (hrs.) | Corrosion Rate (mph) |
|---|---|---|---|---|---|---|---|
| 1 | | | | | | | |
| 2 | 0 | 0 | 0 | 2.4 | 120 | 24 | 76.8[b] |
| 3 | 0 | 0 | 0 | 2.4 | 120 | 24 | 83.5[b] |
| 4 | 0 | 0 | 0 | 2.4 | 120 | 24 | 75.3 |
| 5 | 0 | 0 | 0 | 2.4 | 120 | 24 | 78.3 |
| 6 | 0.10 | 0 | 0.25 | 2.4 | 120 | 24 | 74.4 |

[a]Test liquid for each test was 135 ml of 2% KCl brine and 15 ml kerosene to which was added the identified inhibitors and foamer. Total system volume was approximately 215 ml.
[b]Severe pitting observed.
[1]Homco MC-21
[2]Amtech MC-1
[3]Homco SF-1009

| Run No. | Inhibitor[1] A (wt %) | Inhibitor[2] D (wt %) | Foamer[3] (wt %) | Air (psig) | Temperature (°F.) | Time (hrs.) | Corrosion Rate (mph) |
|---|---|---|---|---|---|---|---|
| 7 | 0 | 0.10 | 0.20 | 2.5 | 120 | 24 | 61.5 |
| 8 | 0.10 | 0.10 | 0.20 | 2.5 | 120 | 24 | 61.7 |
| 9 | 0.15 | 0.10 | 0.20 | 2.5 | 120 | 24 | 58.3 |
| 10 | 0 | 0.10 | 0.25 | 2.5 | 120 | 24 | 59.6 |
| 11 | 0.10 | 0.10 | 0.25 | 2.5 | 120 | 24 | 59.0 |
| 12 | 0.15 | 0.10 | 0.25 | 2.5 | 120 | 24 | 62.5 |
| 13 | 0 | 0.15 | 0.20 | 2.5 | 120 | 24 | 58.8 |
| 14 | 0.10 | 0.15 | 0.20 | 2.5 | 120 | 24 | 57.9 |
| 15 | 0.15 | 0.15 | 0.20 | 2.5 | 120 | 24 | 53.9 |
| 16 | 0 | 0.15 | 0.25 | 2.5 | 120 | 24 | 53.6 |
| 17 | 0.10 | 0.15 | 0.25 | 2.5 | 120 | 24 | 55.0 |
| 18 | 0.15 | 0.15 | 0.25 | 2.5 | 120 | 24 | 51.8 |
| 19 | 0 | 0.20 | 0.20 | 2.5 | 120 | 24 | 50.4 |
| 20 | 0.10 | 0.20 | 0.20 | 2.5 | 120 | 24 | 50.8 |
| 21 | 0.15 | 0.20 | 0.20 | 2.5 | 120 | 24 | 50.2 |
| 22 | 0 | 0.20 | 0.25 | 2.5 | 120 | 24 | 52.2 |
| 23 | 0.10 | 0.20 | 0.25 | 2.5 | 120 | 24 | 50.8 |
| 24 | 0.15 | 0.20 | 0.25 | 2.5 | 120 | 24 | 49.9 |

[a]Test liquid was 135 ml of 2% KCl brine and 15 ml kerosene to which was added the identified inhibitors and foamer. Total system volume was approximately 215 ml.
[1]Homco MC-21
[2]Amtech MC-1
[3]Homco SF-1009

| Run No. | Inhibitor[1] A (wt %) | Inhibitor[4] E (wt %) | Foamer[3] (wt %) | Air (psig) | Temperature (°F.) | Time (hrs.) | Corrosion Rate (mph) |
|---|---|---|---|---|---|---|---|
| 25 | 0 | 0.10 | 0.20 | 2.5 | 120 | 24 | 4.99 |
| 26 | 0.10 | 0.10 | 0.20 | 2.5 | 120 | 24 | 5.36 |
| 27 | 0.15 | 0.10 | 0.20 | 2.5 | 120 | 24 | 5.06 |
| 28 | 0 | 0.10 | 0.25 | 2.5 | 120 | 24 | 4.95 |
| 29 | 0.10 | 0.10 | 0.25 | 2.5 | 120 | 24 | 5.88 |
| 30 | 0.15 | 0.10 | 0.25 | 2.5 | 120 | 24 | 4.82 |
| 31 | 0 | 0.15 | 0.20 | 2.5 | 120 | 24 | 4.86 |
| 32 | 0.10 | 0.15 | 0.20 | 2.5 | 120 | 24 | 4.95 |
| 33 | 0.15 | 0.15 | 0.20 | 2.5 | 120 | 24 | 4.29 |
| 34 | 0 | 0.15 | 0.25 | 2.5 | 120 | 24 | 3.86 |
| 35 | 0.10 | 0.15 | 0.25 | 2.5 | 120 | 24 | 4.67 |
| 36 | 0.15 | 0.15 | 0.25 | 2.5 | 120 | 24 | 4.50 |
| 37 | 0 | 0.20 | 0.20 | 2.5 | 120 | 24 | 5.02 |
| 38 | 0.10 | 0.20 | 0.20 | 2.5 | 120 | 24 | 4.59 |
| 39 | 0.15 | 0.20 | 0.20 | 2.5 | 120 | 24 | 5.09 |
| 40 | 0 | 0.20 | 0.25 | 2.5 | 120 | 24 | 5.01 |
| 41 | 0.10 | 0.20 | 0.25 | 2.5 | 120 | 24 | 4.55 |
| 42 | 0.15 | 0.20 | 0.25 | 2.5 | 120 | 24 | 4.33 |

[a]Test liquid was 135 ml of 2% KCl field brine and 15 ml kerosene to which was added the identified inhibitors and foamer. Total system volume was approximately 215 ml.
[1]Homco MC-1
[2]Amtech MC-21
[3]Homco SF-1009
[4]Amtech B-1

Control Test Series #5

Control Test Series #5 provides comparative data regarding the applicability of Inhibitor D (Amtech MC-1), Inhibitor E (Amtech B-1) and Inhibitor F (Baker Cronox C-617) as corrosion inhibitors at 120° F. The test results indicate Inhibitor F (Run 15) to be superior to Inhibitor E (Runs 9–14) which is markedly superior to Inhibitor D (Runs 1–8). The results for the latter comparison are consistent with those reported for Control Series #4. The active components in some of these inhibitors and their respective souces are identified in Table X.

Test conditions and results are presented in Table V. All tests were conducted at 120° F. using the Wheel Test procedures previously presented in Control Test Series #1.

Based on the corrosion inhibition results for Control Test Series #1 through #5 wherein 6 commercially available corrosion inhibitors were evaluated, the preferred corrosion inhibitor among the six tested at these test conditions is Inhibitor F.

TABLE V

Wheel Test Results at 120° F for Identified Commercial Inhibitors[a]

| Run No. | Inhibitor[1] A (wt %) | Inhibitor[2] D (wt %) | Foamer[3] (wt %) | Air (psig) | Temperature (°F.) | Time (hrs.) | Corrosion Rate (mph) |
|---|---|---|---|---|---|---|---|
| 1 | 0    | 0    | 0    | 2.5 | 120 | 24 | 216.5 |
| 2 | 0.10 | 0    | 0.25 | 2.5 | 120 | 24 | 216.5 |
| 3 | 0    | 0.10 | 0.20 | 2.5 | 120 | 24 | 181.7[b] |
| 4 | 0.10 | 0.10 | 0.20 | 2.5 | 120 | 24 | 149.3[b] |
| 5 | 0.15 | 0.10 | 0.20 | 2.5 | 120 | 24 | 125.3[b] |
| 6 | 0    | 0.10 | 0.25 | 2.5 | 120 | 24 | 192.5[b] |
| 7 | 0.10 | 0.10 | 0.25 | 2.5 | 120 | 24 | 192.6 |
| 8 | 0.20 | 0.10 | 0.25 | 2.5 | 120 | 24 | 177.6 |

[a]Test liquid was 135 ml of 2% KCl brine and 15 ml kerosene to which was added the identified inhibitors and foamer. Total system volume was approximately 215 ml.
[b]Severe pitting
[c]Some pitting
[1]Homco MC-21
[2]Amtech MC-1
[3]Homco SF-1009

| Run No. | Inhibitor[1] A (wt %) | Inhibitor[4] E (wt %) | Foamer[3] (wt %) | Air (psig) | Temperature (°F.) | Time (hrs.) | Corrosion Rate (mph) |
|---|---|---|---|---|---|---|---|
| 9  | 0    | 0.10 | 0.20 | 2.5 | 120 | 24 | 6.88[c] |
| 10 | 0.10 | 0.10 | 0.20 | 2.5 | 120 | 24 | 10.2[c] |
| 11 | 0.15 | 0.10 | 0.20 | 2.5 | 120 | 24 | 10.4[c] |
| 12 | 0    | 0.10 | 0.25 | 2.5 | 120 | 24 | 9.25[c] |
| 13 | 0.10 | 0.10 | 0.25 | 2.5 | 120 | 24 | 9.78[c] |
| 14 | 0.15 | 0.10 | 0.25 | 2.5 | 120 | 24 | 9.49 |

| Run No. | Inhibitor[1] A (wt %) | Inhibitor[5] (wt %) | Foamer[3] F | Air (psig) | Temperature (°F.) | Time (hrs.) | Corrosion Rate (mph) |
|---|---|---|---|---|---|---|---|
| 15 | 0.10 | 0.10[5] | 0.25 | 2.5 | 120 | 24 | 5.49 |

[a]Test liquid was 135 ml of 2% KCl brine and 15 ml kerosene to which was added the identified inhibitors and foamer. Total system volume of approximately 215 ml.
[b]Severe pitting
[c]Some pitting
[1]Homco MC-21
[2]Amtech MC-1
[3]Homco SF-1009
[4]Amtech B-1 (See Footnote 5)
[5]Inhibitor F, Baker Cronox C-617

Test Series #1

This test series with the exception of one run was conducted at 200° F. and conclusively establishes that potassium hydroxide and phenol in combination is superior to the best corrosion inhibitor identified in Control Test Series #1 through #5, that corrosion inhibitor being Inhibitor F (Baker Cronox C-617). The test series also establishes the effectiveness of the potassium hydroxide/phenol corrosion inhibitor at phenol to oxygen molar ratios in the test apparatus of significantly less than 1.0.

Test procedures were similar to those presented for Control Test Series #1. Chemical concentrations, tests conditions and results are presented in Table VI for Inhibitor F (Runs 4–6) and the inventive corrosion inhibitor (Runs 7–12). Whereas Inhibitor F demonstrates unacceptable performance at 200° F. and 10 and 100 psig pressure (corrosion rates of 23.0 and 43.4 mpy, respectively), the corrosion rates for the inventive formulation are approximately an order of magnitude less (2.71 and 2.73 mpy, respectively). Whereas the corrosion rates for Inhibitor F at concentrations similar to the inventive inhibitor were found to be a function of air pressure, such a dependence was not observed for the inventive inhibitor. As noted, the inventive inhibitor was effective at phenol to oxygen molar ratios in the system of significantly less than 1.

TABLE VI

Wheel Test Results at 120° F. and 200° F. for Inhibitor F and Inventive Corrosion Inhibitor Formulation

| Test[a] No. | Inhibitor F[1] (wt %) | KOH (wt %) | Phenol (wt %) | Foamer[2] (wt %) | Air Pressure (psig) | Temperature (°F.) | Test Time (hrs.) | Corrosion Rate (mpy) |
|---|---|---|---|---|---|---|---|---|
| 1 | 0 | 0 | 0 | 0 | 2.5 | 120 | 24 | 216.5[b] |
| 2 | 0 | 0 | 0 | 0 | 50 | 200 | 48 | 34.0[b] |
| 3 | 0 | 0 | 0 | 0 | 200 | 200 | 48 | 102.1[b] |
| 4 | 0.1 | 0 | 0 | 0.25 | 2.5 | 120 | 24 | 5.49 |
| 5 | 0.15 | 0 | 0 | 0.20 | 10.0 | 200 | 48 | 23.0 |
| 6 | 0.15 | 0 | 0 | 0.20 | 100.0 | 200 | 48 | 43.4[b] |
| 7 | 0 | 5 | 0.15 | 0 | 10 | 200 | 48 | 5.76 |
| 8 | 0 | 10 | 0.15 | 0 | 10 | 200 | 48 | 2.78 |
| 9 | 0 | 10 | 0.15 | 0.20 | 10 | 200 | 48 | 2.71 |
| 10 | 0 | 10 | 0.15 | 0.20 | 50 | 200 | 48 | 2.82 |
| 11 | 0 | 10 | 0.15 | 0.20 | 100 | 200 | 48 | 2.73 |
| 12[c] | 0 | 10 | 0.15 | 0.20 | 200 | 200 | 48 | 2.19 |

[a]Test liquid was 80 ml of 2% KCl brine to which was added the above specified chemicals, inhibitors and foamer. Total system volume was approximately 120 ml.
[b]Pittings
[c]Mole ratio of phenol to oxygen in test appartus was 0.148.
[1]Baker Cronox C-617
[2]Homco SF-1009

Test Series #2

This test series further illustrates the outstanding corrosion inhibition properties possessed by NaOH/phenol and KOH/phenol in highly oxidative environments (air, water and carbon steel coupon at 350° F. and 7 psig).

Test results and conditions are presented in Tables VII and VIII. Test procedures were similar to those described for Control Test Series #1.

Test results for Inhibitor F which was shown in Control Test Series #5, Run #15, to be the most promising of the commercial inhibitors tested are presented in Table VII. The test results confirm at a higher temperature the results presented in Test Series #1. These results indicated Inhibitor F to be ineffective as a corrosion inhibitor at elevated temperatures.

Results presented in Table VIII for Test #1 and #2 clearly demonstrate that corrosion rates are unacceptable in the studied system in the absence of a corrosion inhibitor. Test results for Test #3 and #4 show that the foaming agent used in these studies fails to provide corrosion inhibition. The results obtained in Test #5 show that phenol by itself at 0.30 wt % provides little if any corrosion inhibition. Test Numbers 6–7 and 8–9 respectively show that the addition of either NaOH or KOH to the studied systems results in significant corrosion inhibition. Of the two, KOH appears to provide better corrosion inhibition performance at a given weight percentage. The combination of either NaOH or KOH with phenol unexpectedly enhanced corrosion inhibition as evidenced by the results for Test Numbers 10–15 over that observed for the individual alkali metal hydroxides. The degree of corrosion inhibition for the NaOH/phenol system (Run #10–11) and the KOH/phenol systems (Run #12–14) were similar.

Test results obtained for Runs #17–20 wherein KOH and phenol was used for corrosion inhibition at 350° F. further show the excellent inhibition properties of these chemicals when used in combination at greater air pressures. The greater air pressure correspond to greater partial pressures of the oxygen oxidizing agent.

TABLE VII

Wheel Test Results at 300° F. for Commercial Inhibitor F

| Test[a] No. | Inhibitor F[1] (wt %) | Foamer[2] (wt %) | Air (psig) | Temperature (°C.) | Time (hrs.) | Corrosion Rate (mpy) |
|---|---|---|---|---|---|---|
| 1 | 50 | 1 | 7 | 320 | 24 | 33.4[b] |
| 2 | 1 | 1 | 7 | 320 | 24 | 26.7[b] |

[a]Test liquid was 80 ml of 2% KCl field brine containing above designated components at designated weight percentages. Total system volume was 120 ml.
[b]Pitting
[1]Baker Cronox C-617
[2]Homco SF-1009

TABLE VIII

Wheel Test Results at 300° F. and 350° F.

| Test[a] No. | NaOH (wt %) | KOH (wt %) | Phenol (wt %) | Foamer[1] (wt %) | Air (psig) | Temperature (°F.) | Time (hrs.) | Corrosion Rate (mpy) |
|---|---|---|---|---|---|---|---|---|
| 1 | 0 | 0 | 0 | 0 | 5 | 300 | 48 | 11.5[b] |
| 2 | 0 | 0 | 0 | 0 | 5 | 350 | 55 | 11.6[b] |
| 3 | 0 | 0 | 0 | 0.2 | 5 | 300 | 48 | 13.5[b] |
| 4 | 0 | 0 | 0 | 0.2 | 10 | 350 | 55 | 16.4 |
| 5 | 0 | 0 | 0.30 | 0.2 | 5 | 350 | 55 | 14.2[b] |
| 6 | 5 | 0 | 0 | 0.2 | 5 | 350 | 55 | 4.06 |

TABLE VIII-continued

Wheel Test Results at 300° F. and 350° F.

| Test[a] No. | NaOH (wt %) | KOH (wt %) | Phenol (wt %) | Foamer[1] (wt %) | Air (psig) | Temperature (°F.) | Time (hrs.) | Corrosion Rate (mpy) |
|---|---|---|---|---|---|---|---|---|
| 7 | 10 | 0 | 0 | 0.2 | 5 | 350 | 55 | 6.31 |
| 8 | 0 | 5 | 0 | 0.2 | 5 | 350 | 55 | 3.70 |
| 9 | 0 | 10 | 0 | 0.2 | 5 | 350 | 55 | 3.98 |
| 10 | 5 | 0 | 0.15 | 0.2 | 5 | 350 | 55 | 3.11 |
| 11 | 10 | 0 | 0.30 | 0.2 | 5 | 350 | 55 | 2.42 |
| 12 | 0 | 5 | 0.15 | 0.2 | 5 | 350 | 55 | 2.44 |
| 13 | 0 | 10 | 0.30 | 0.2 | 5 | 350 | 55 | 2.95 |
| 14 | 0 | 10 | 0.30 | 0.2 | 5 | 350 | 55 | 1.90 |
| 15 | 0 | 1 | 0.30 | 0.2 | 5 | 350 | 55 | 3.42[b] |
| 16 | 0 | 1 | 0.05 | 0.2 | 10 | 350 | 55 | 4.27[b] |
| 17 | 0 | 5 | 0.05 | 0.2 | 10 | 350 | 55 | 3.13 |
| 18 | 0 | 10 | 0.05 | 0.2 | 10 | 350 | 55 | 3.32 |
| 19 | 0 | 1 | 0.10 | 0.2 | 10 | 350 | 55 | 3.06 |
| 20 | 0 | 10 | 0.10 | 0.2 | 10 | 350 | 55 | 3.43 |

[a]Test liquid was 80 ml of 2% KCl to which the designated components were added in the designated weight percentages.
[b]Pitting
[1]Homco SF-1009

Test Series #3

This series of tests further illustrate the beneficial corrosion inhibition imparted by a phenolic compound, phenol, when added to a brine solution containing a hydroxide-bearing compound capable of imparting a pH of at least 9 to a base aqueous fluid, KOH, or $NH_4OH$ and/or a foaming agent. For every combination, the addition of phenol was found to reduce the corrosion rate (i.e., improve corrosion inhibition).

Test results and conditions are presented in Table IX. Test procedures were analogous to those reported for Control Test Series #1. The tests were conducted by exposing the air/brine/coupon system to a temperature of 350° F. for 42.5 hrs. Test Numbers 1–5 concern corrosion inhibition in an air/brine system containing KOH (Run #1), an air/brine system containing KOH and Foamer (Run #2), an air/brine system containing KOH and phenol (Run #3), an air/brine system containing KOH, foamer and phenol (Runs #4 and #5). Test Numbers 6–10 similarly concern corrosion inhibition in an air/brine system containing $NH_4OH$ (Run #6), an air/brine system containing $NH_4OH$ and foamer (Run #7), an air/brine system containing $NH_4OH$ and phenol (Run #8), an air/brine system containing $NH_4OH$, foamer, and phenol (Runs #9 and #10). The results for Runs #4 and #5 and for Runs #9 and #10 additionally and surprisingly show a reduction in corrosion rates when the phenol concentration is reduced from 0.3 wt. % to 0.15 wt. %. As previously noted, the addition of phenol to the fluid system in all tests resulted in a reduction in corrosion rate. The magnitude of the reduction was generally greater for solutions containing KOH rather than $NH_4OH$. The corrosion rates for comparable systems were generally lower for those systems containing $NH_4OH$ than for KOH.

TABLE IX

Wheel Test Results at 350° F.

| Test No.[a,b] | KOH (wt %) | NH4OH (wt %) | Phenol (wt %) | Foamer[c] (wt %) | Corrosion Rate (mpy) |
|---|---|---|---|---|---|
| 1 | 10 | 0 | 0 | 0 | 7.43 |
| 2 | 10 | 0 | 0 | 0.2 | 7.04 |
| 3 | 10 | 0 | 0.3 | 0 | 3.32 |
| 4 | 10 | 0 | 0.3 | 0.2 | 3.20 |
| 5 | 10 | 0 | 0.15 | 0.2 | 3.01 |
| 6 | 0 | 10 | 0 | 0 | 4.24 |
| 7 | 0 | 10 | 0 | 0.2 | 3.38 |
| 8 | 0 | 10 | 0.3 | 0 | 2.81 |
| 9 | 0 | 10 | 0.3 | 0.2 | 2.57 |
| 10 | 0 | 10 | 0.15 | 0.2 | 2.32 |

[a]80 ml of total fluid used in each test. Fluids for Test Numbers 1–5 were prepared from 80 ml of 2% KCl brine to which KOH, phenol and foamer were added in the designated percentages. Fluids for Test Numbers 6–10 were prepared from 65 ml of 2% KCl brine and 15 ml of 60 wt % $NH_4OH$ to which phenol and foamer were added in the designated percentages. Total system volume was 120 ml.
[b]Test conditions were 350° F. and 7.6 psig for 42.5 hrs. Overburden gas was air.
[c]Foamer was Homco SF-1009

TABLE X

Commercial Inhibitors

| Inhibitor | Tradename | Active Components[1] |
|---|---|---|
| A | Homco MC-21[2] | Amine, methanol |
| B | Homco MC-117[2] | Ethylene glycol |
| C | Homco AC-105-C[2] | Methanol |
| D | Amtech MC-1[3] | Ethylene glycol, methanol |
| E | Amtech B-1[3] | Ethylene glycol |
| F | Baker Cronox C-617[4] | Phosphonate, 2-butoxyethanol |

[1]Components disclosed on Material Safety Data Sheet. Other active components may be present but were not disclosed.
[2]Homco International, Inc., P.O. Box 26292, 6021 Camille Avenue, Oklahoma City, OK, 72129
[3]Amtech Corp., 2221 S. Eastern, Oklahoma City, OK, 73129
[4]Baker Performance Chemicals, Inc., 3920 Esses Lane, Houston, TX That which is claimed is:

1. A corrosion inhibitor comprising at least one hydroxide-bearing compound capable of imparting a pH of at least 9 to water and at least one phenolic compound.

2. The composition of matter of claim 1 wherein said phenolic compound is of the formula

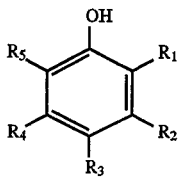

wherein $R_1$, $R_2$, $R_3$, $R_4$ and $R_5$ are independently selected from the group consisting of hydroxyl groups, alkoxy groups containing from 1 to 6 carbon atoms; alkyl groups containing from 1 to 6 carbon atoms, a phenyl group, $NO_2$, COOH, COH, sulfonic acids, ketones containing from 1 to 6 carbon atoms, F, Cl, Br, I, hydrogen, or the salts of any of the preceding acids or alcohols, wherein at least two of the above R groups are hydrogen; or phenolic mixtures thereof, and the resulting compound is water soluable or dispersible.

3. The composition of matter according to claim 2 wherein said hydroxide-bearing compound is an alkali metal hydroxide, ammonium hydroxide or a mixture thereof.

4. The composition of matter according to claim 3 wherein said alkali metal hydroxide is sodium hydroxide or potassium hydroxide.

5. The composition of matter according to claim 4 wherein said phenolic compound is phenol, o-cresol, o-fluorophenol, o-chlorophenol, o-bromophenol, o-iodophenol, o-nitrophenol, catechol, resorcinol, guaiacol, hydroquinone, salicylaldehyde phloroglucinol, pyrogallol 4,4-biphenol, 1,3-dihydroxy naphthalene, or o-allylphenol or the salts thereof.

6. The composition of matter according to claim 5 wherein said phenolic compound is phenol, o-cresol, salicyaldehyde, or o-nitrophenol or the ammonium, potassium or sodium salts thereof.

7. The composition of matter according to claim 6 wherein said phenolic compound is phenol or a sodium or potassium salt thereof and said hydroxide-bearing compound is sodium hydroxide or potassium hydroxide.

8. The composition of matter of claim 1 wherein said corrosion inhibitor is additionally comprised of water.

9. The composition of matter of claim 7 wherein said corrosion inhibitor is additionally comprised of water.

10. A foam comprising a dispersed gaseous phase and a continuous liquid phase wherein said liquid phase is comprised of (a) water in a major portion, (b) a foaming agent in amounts effective to form a 60 to 99.75% quality foam, and a (c) corrosion inhibitor wherein said corrosion inhibitor is comprised of at least one hydroxide-bearing compound in concentrations sufficient to impart a pH of at least 9 to said liquid phase and an effective amount of at least one phenolic compound.

11. The composition of matter of claim 10 wherein said phenolic compound is of the formula

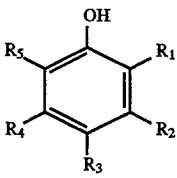

wherein $R_1$, $R_2$, $R_3$, $R_4$ and $R_5$ are independently selected from the group consisting of hydroxyl groups, alkoxy groups containing from 1 to 6 carbon atoms; alkyl groups containing from 1 to 6 carbon atoms, a phenyl group, $NO_2$, COOH, COH, sulfonic acids, ketones containing from 1 to 6 carbon atoms, F, Cl, Br, I, hydrogen, or the salts of any of the preceding acids or alcohols wherein at least two of the above R groups are hydrogen; or phenolic mixtures thereof, and the resulting compound is water soluable or dispersible.

12. The composition of matter according to claim 11 wherein said hydroxide-bearing compound is an alkali metal hydroxide, ammonium hydroxide or a mixture thereof.

13. The composition of matter according to claim 12 wherein said gaseous phase is comprised of nitrogen and at least one component selected from oxygen, hydrogen sulfide, or carbon dioxide.

14. The composition of matter according to claim 13 wherein said alkali metal hydroxide is sodium hydroxide or potassium hydroxide.

15. The composition of matter according to claim 14 wherein said gaseous phase is comprised in major portion of air.

16. The composition of matter according to claim 15 wherein said phenolic compound is phenol, o-cresol, o-fluorophenol, o-chlorophenol, o-bromophenol, o-iodophenol, o-nitrophenol, catechol, resorcinol, guaiacol, hydroquinone, salicylaldehyde phloroglucinol, pyrogallol, 4,4-biphenol, 1,3-dihydroxy naphthalene, or o-allylphenol or salts thereof.

17. The composition of matter according to claim 16 wherein said phenolic compound is phenol, o-cresol, salicyaldehyde, or o-nitrophenol or the ammonium, potassium or sodium salts thereof.

18. The composition of matter according to claim 17 wherein said phenolic compound is phenol or the sodium or potassium salts thereof and said hydroxide-bearing compound is sodium hydroxide or potassium hydroxide.

19. The composition according to claim 10 wherein said foaming agent is comprised of at least one N-acrylsarcosinate, sodium N-acryl-N-alkyltaurate, alkyl sulfate, ethoxylated and sulfated alcohol, ethoxylated and sulfated alkylphenol, fatty acid diethanolamide, amine oxide, alkyl betaine, or amidopropylbetaine.

20. The composition according to claim 10 wherein said foaming agent is comprised of at least one amidopropylbetaine.

21. The composition according to claim 20 wherein said foaming agent is additionally comprised of one or more aliphatic or alkyl aryl hydrocarbon sulfonates of formula $$R-SO_3M$$

wherein R is an oleophilic group having from 10 to 18 carbon atoms and M is an alkali metal or ammonium cation.

22. The composition according to claim 20 wherein said foaming agent is comprised of cocoamidopropylbetaine and at least one ethoxylated and sulfated alcohol.

* * * * *